Aug. 7, 1956  G. A. LYON  2,757,974
WHEEL COVER
Filed Dec. 11, 1952  2 Sheets-Sheet 1
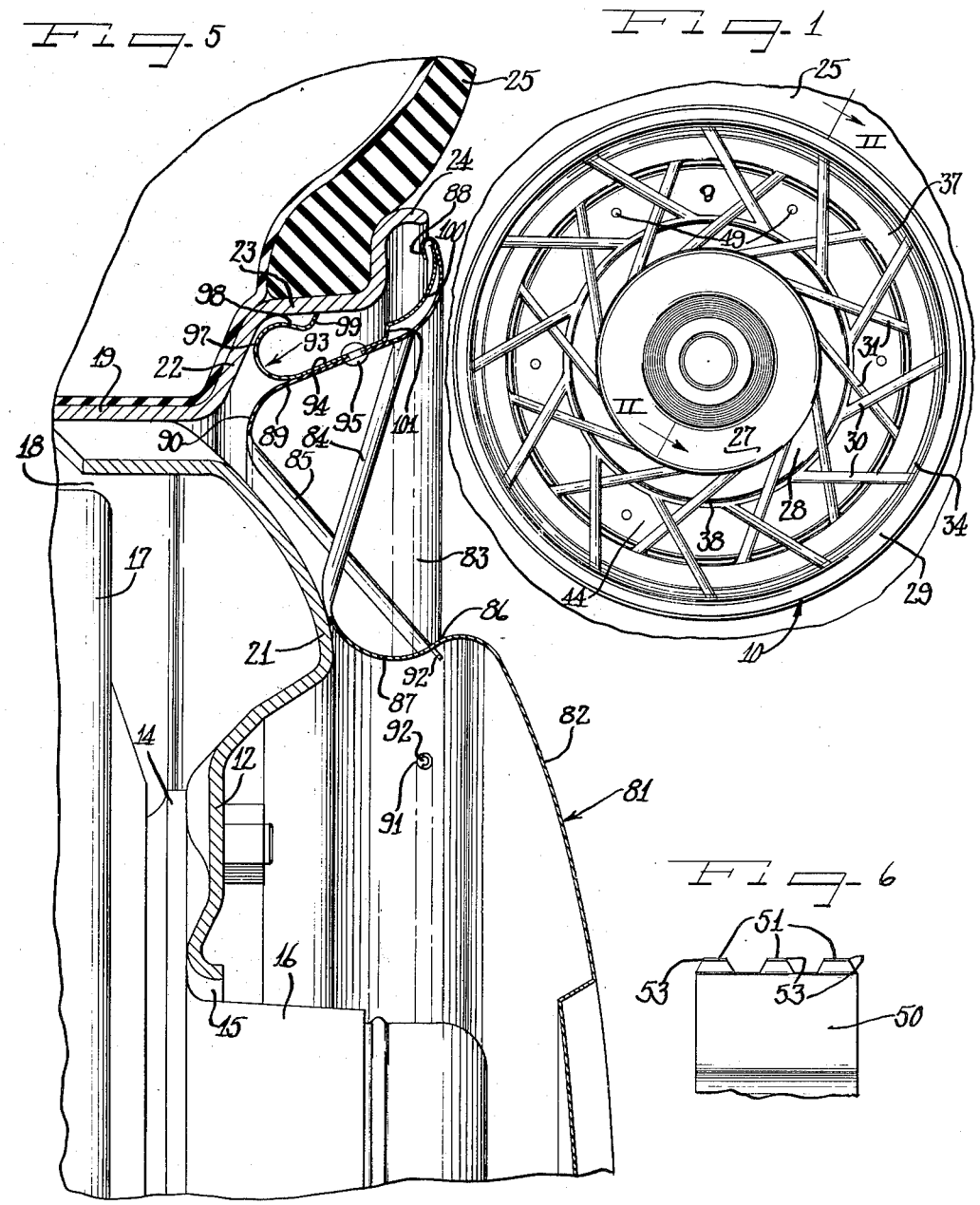
Inventor
George Albert Lyon
By Hill, Sherman, Meroni, Gross & Simpson
Attys

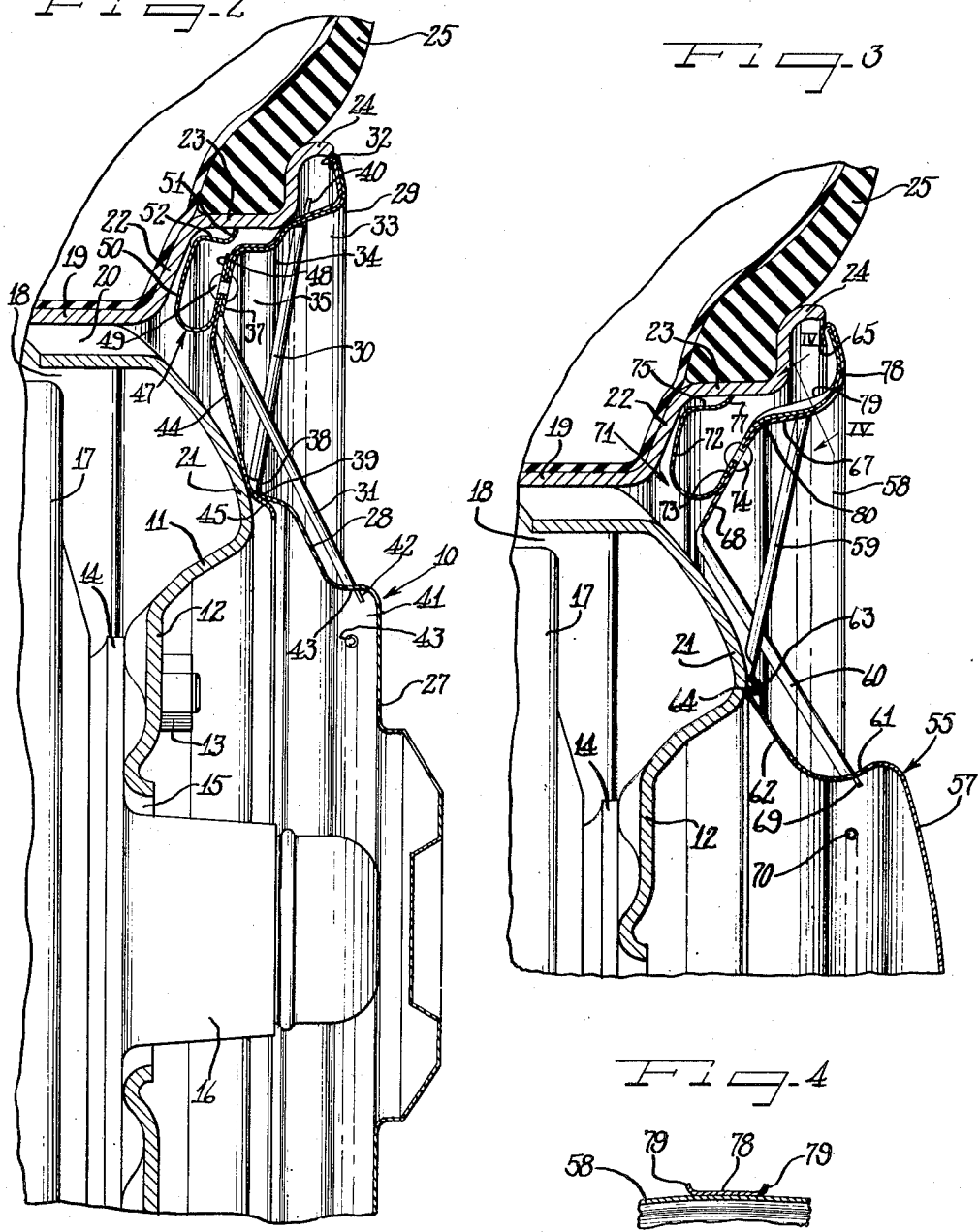

United States Patent Office 2,757,974
Patented Aug. 7, 1956

2,757,974

WHEEL COVER

George Albert Lyon, Detroit, Mich.

Application December 11, 1952, Serial No. 325,339

12 Claims. (Cl. 301—37)

The present invention relates to improvements in wheel structures and particularly concerns the ornamental and protective covering of the outer side of vehicle wheels.

An important object of the present invention is to provide in a wheel structure of the disk spider type a cover for the outer side of the wheel which will simulate a wire wheel construction.

Another object of the invention is to provide an improved cover structure for the outer side of vehicle wheels.

A further object of the invention is to provide a cover structure for disposition at the outer side of a vehicle wheel and which has spoke simulating means thereon, but provides means for closing off at least a portion of the wheel behind the cover against entry of dirt thereto behind the cover.

Still another object of the invention is to provide improved vehicle wheel cover structure having novel retaining means thereon.

Yet another object of the invention is to provide a vehicle wheel cover made from thin sheet material and having improved means for facilitating pry-off.

Other objects, features and advantages will be apparent from the following detailed description of certain preferred embodiments of the invention taken in conjunction with the accompanying drawings in which:

Figure 1 is an outer side elevational view of a wheel embodying features of the invention;

Figure 2 is an enlarged fragmentary diametrical sectional view taken substantially on the line II—II of Figure 1;

Figure 3 is a diametrical sectional view similar to Figure 2, but showing a modified cover construction;

Figure 4 is a fragmentary detail sectional view taken substantially on the line IV—IV of Figure 3;

Figure 5 is a sectional detail view similar to Figures 2 and 3, but showing a further modification; and Figure 6 is a fragmentary rear elevational view of one of the retaining spring finger members of the cover of Figure 2.

Having reference to the form of the invention shown in Figures 1, 2 and 6, a cover 10 is applied to the outer side of a vehicle wheel comprising a disk spider body 11 provided with a dished central bolt-on flange 12 secured as by means of attachment bolts 13 to a hub flange 14 of a vehicle and having a central aperture 15 through which a vehicle hub 16 projects. The hub flange 14 carries a brake drum 17. At its outer margin the wheel body 11 has a generally axially extending flange 18 by which it is attached to a base flange 19 of a tire rim. At suitable intervals the marginal flange 18 of the wheel body is inset to provide wheel openings 20. Intermediately the wheel body 11 has an annular axially outwardly projecting reinforcing nose bulge 21.

The tire rim has a side flange 22 which projects generally radially outwardly from the outer side of the base flange 19 and merges with a generally axially outwardly and radially outwardly sloping intermediate flange 23 to which is integrally joined a terminal flange 24. The tire rim is of the multi-flange, drop center type adapted to support a tire and tube assembly 25.

The cover 10 is constructed and arranged to be self-retained on the wheel and is provided with means to afford the illusion of the wheel being a wire spoke wheel. To this end, the cover 10 comprises a central crown portion 27 having a sloping side wall 28 and defining a chamber receptive of the wheel hub 16 when the cover is on the wheel. The central crown portion 27 is preferably a sheet metal stamping which may comprise brass or stainless steel, or any other preferred material subject to the preferred external finish such as plating and polishing, or merely burnishing.

The central crown portion 27 is assembled with an annular trim portion 29 by means of spoke-like extensions 30 projecting from the central crown portion into engagement with the trim annulus, and spoke-like extensions 31 from the trim annulus engaging the side wall 28 of the central crown member of the cover.

In a preferred form the trim annulus 29 is of a diameter to substantially overlie the tire rim including the terminal flange 24 and is preferably of a cross-sectional contour generally simulative of the tire rim. To this end, the marginal trim member 29 is constructed to extend generally axially and radially inwardly alongside the tire rim. At its outer extremity the member 29 has an underturned reinforcing and finishing flange 32 which in assembly lies adjacent to the terminal edge of the tire rim terminal flange 24. That portion of the member 29 that overlies the terminal flange is preferably of generally arched, rib-like cross-section which affords not only a reinforcing structure, but also provides therebehind a chamber for reception of wheel balancing weights. From its outer portion the member 29 slopes generally radially and axially inwardly to provide a flange portion 33 that merges with an angular generally radially inwardly directed narrow shoulder 34 projecting inwardly beyond the intermediate flange 23 to a generally axially inwardly extending intermediate flange portion 35 joining a generally radially inwardly extending terminal flange portion 37 which in assembly is adapted to lie in spaced relation to the side flange 22 of the tire rim.

The spoke-like extensions 30 and 31 are formed integral in one piece with respectively the inner crown member 27 and the annular outer trim member 29 and extend from the respective adjacent, though substantially spaced edges of the cover members. Thus, the spoke extensions 30 project generally radially and axially outwardly as integral extensions from the extremity of the side wall 28 of the inner cover member provided at juncture with the spoke elements with a continuous annular generally radially outwardly extending narrow flange 38 joining the side wall 28 on an annular reinforcing and shoulder rib 39.

The spoke elements or extensions 30 preferably angle in one peripheral direction uniformly about the member 27 in a generally counterclockwise direction as seen in Figure 1, and are of a length to extend at their outer end portions into engagement with the flange 33 of the outer annular cover member adjacent to the shoulder 34. At their extremities the spoke elements 30 are provided with attachment lugs 40 which are engaged retainingly in suitable apertures in the flange portion 33 of the outer annular member.

The spoke elements 31 of the outer annular member extend integrally from the inner edge of the flange 37 and are angled generally radially inwardly and axially outwardly and preferably also in counterclockwise peripheral direction to cross under the inner end portions of the spoke elements 30. The spoke elements 31 are of a length to extend at their inner end portions into retaining engagement with a stepped wall portion 41 adjacent to the axially outwardly facing crown portion of the member 27. Extremity lugs 42 on the spoke elements 31 are engaged retainingly in appropriate apertures 43 provided therefor in the flange portion 41.

Both the inner cover member 27 and the outer cover member 29, as well as the spoke extensions 30 and 31 may be polished to a lustrous finish.

In order to provide a closure across the back of the opening through the wheel between the spokes which connect the two spaced circular members, a backplate 44 is provided which is preferably formed as an annulus which is of complementary cross-section to and nested behind the outer annular cover member 33 and has its outer extremity clamped in place by the underturned flange 32. From behind the inner flange 37 of the outer cover member, the backplate 44 extends generally radially inwardly and axially outwardly to an inner marginal curved flange 45 which is arranged to nestingly receive the rib-like shoulder 39 of the marginal extremity of the inner cover member 27. The exposed portion of the plate 44 may be painted black or some other dark color so as to give the impression of a void behind the spoke elements 30 and 31 when the cover is viewed from the outer side. Thereby, the appearance of the cover is improved and the spoke wheel simulating effect of the cover is enhanced.

To retain the cover on the wheel, it is provided at spaced intervals with cover retaining clips 47. Each of these clips is preferably a spring steel loop having a base flange 48 attached as by means of a rivet 49 to the back of the cover plate 44 and the outer cover member flange 47, thereby additionally securing the backplate 44 to the outer cover member. A return bent spring loop 50 on the clip or spring finger 47 extends in the space between the outer cover member and the side flange 22 of the tire rim and projects generally radially outwardly toward the intermediate flange 23 against which the retaining finger member engages by means of a short and stiff retaining terminal structure 51 on a generally axially outwardly extending terminal leg 52. As best seen in Figure 6, the terminal structure 51 comprises a series of short retaining finger terminals 51 which taper toward their tips and provide a multiple series of corners 53 at their edges which will dig into the surface of the intermediate flange 23 and retain the cover against turning on the wheel.

To apply the cover to the outer side of the wheel, the cover is generally centered with respect to the wheel and pushed axially inwardly so that the retaining spring fingers 47 will engage under resilient compression with the retaining terminals 51 thereof biting into the engaged surface of the tire rim intermediate flange 23. By having the inner portion of the plate 44 and the nested shoulder rib 39 engaging against the nose bulge 21 of the wheel body, substantially complete closure for the chamber within the inner cover member 27, excluding dirt therefrom is provided.

In the modification shown in Figures 3 and 4, the wheel is identical with the wheel shown in Figures 1 and 2 and, therefore, the same reference numerals are applied to identify the wheel. To the outer side of the wheel is applied a cover 55 comprising a central crown member 57 and an annular outer marginal trim member 58, the two members being interconnected by respective spoke extensions 59 and 60 thereon. In the present instance the inner cover member 57 has a side wall provided with an undercut shoulder formation 61 merging into a generally radially outwardly and axially inwardly extending flange portion 62 that extends toward engagement with the nose bulge 21 of the wheel body. At its extremity the flange portion 62 is provided with an annular raised rib 63 providing an axially inwardly opening groove within which is seated a resilient annular gasket and cushioning member 64 which engages against the nose bulge 21 and provides an effective seal against entry of dirt into the chamber provided by the inner crown cover member 57, as well as providing a silencing cushion against possible rattling of the cover against the wheel body.

From the radially outer side of the rib 63 spoke members 59 project generally radially and axially outwardly and preferably at a suitable peripheral angle. At their outer ends the spoke members 59 engage against the outer annular cover member 58 in any preferred manner to assist in maintaining the circular cover members in assembled relation.

The annular cover member 58 is preferably of generally arched rib cross-section overlying the tire rim terminal flange 24 in spaced relation and having a return bent underturned reinforcing and finishing flange 65 at the extremity of the member 58. The member 58 is dimensioned to extend generally axially and radially inwardly in spaced relation to the tire rim and for this purpose has a generally axially inwardly extending side wall flange portion 67 against which the outer ends of the spoke elements 59 are engaged and joining a generally radially and axially inwardly sloping flange 68 which in assembly lies in spaced relation to the tire rim side flange 22. From the inner edge of the flange 68 extend integrally in one piece the spoke members 60, directed generally radially and axially outwardly and having their inner end portions engaging the shoulder 61 of the inner cover member. Locked interengagement lugs 69 on the spoke elements 60 extend into retaining apertures 70 in the shoulder 61.

For attaching the cover 55 to the outer side of the wheel, the outer annular cover member 58 carries therebehind a series of retaining spring clip fingers 71 each of which comprises a spring loop 72 having a base flange portion 73 secured as by means of a rivet 74 to the back of the cover member flange 68. The spring loop 72 is arranged to operate in the space between the flange 68 and the tire rim side flange 22 and has a terminal leg 75 extending generally axially outwardly and provided with a short and stiff terminal retaining structure 77 engageable in retaining biting tensioned engagement against the intermediate flange 23 of the tire rim.

Application of the cover 55 to the outer side of the wheel is effected by generally centering the cover relative to the wheel and then pressing the same axially inwardly to effect engagement of the retaining fingers 71 with the tire rim.

In order to remove the cover 55 a pry-off tool is adapted to be applied behind the outer margin of the cover member 58 and leverage applied against the tire rim to effect disengagement of the retaining fingers 71 from the tire rim.

In order to prevent damage to the cover member 58, the retaining finger base flange 73 has an extension 78 which is preferably generally complementary to and lies nested behind the cover member 58 and provides a backing against which the tip of the pry-off tool can be applied. Since the material from which the retaining spring clip fingers 71 are made is preferably a hard spring steel, it will be appreciated that the tip of the pry-off tool will dent the pry-off protective flange 78 only with great difficulty.

To prevent slipping of the tip of the pry-off tool laterally from the flange 78, the sides of the flange in the area engaged by the pry-off tool tip are preferably bent inwardly angularly to provide side retaining flanges 79 extending throughout a substantial length of the flange 78 and to a shoulder 80 against which the pry-off tool is adapted to be finally levered in dislodging the cover from the wheel.

In the form of the invention shown in Figure 5, the details of the wheel are the same as in Figure 2 and accordingly the same reference numerals have been applied. Attached to the outer side of the wheel is a cover 81 comprising a central crown cover portion 82 and an outer annular cover portion 83, the two cover portions being secured together by respective spoke extension elements 84 and 85.

The inner cover member 82 is dimensioned to overlie the central portion of the wheel and provides a chamber within which the wheel hub 16 is accommodated. A side flange 87 on the central cover member provides an undercut type shoulder 86, while the extremity portion of the side wall flange 87 extends generally radially and axially outwardly and is adapted to bear in substantially sealing relation against the nose bulge 21 of the wheel body. The spoke extensions 84 extend generally radially and axially outwardly and are appropriately angled in a peripheral direction. At their outer ends the spoke elements 84 are attached in suitable manner to the annular cover member 83 which is of generally arcuate rib structure overlying the tire rim terminal flange 24 in spaced relation.

The outer annular cover member 83 has an underturned reinforcing and finishing flange 88. A generally radially and axially inwardly extending body flange 89 on the outer cover member lies in spaced relation to the intermediate flange 23 of the tire rim and merges with a terminal generally radially inwardly directed flange portion 90 lying in spaced relation to the side flange 22 of the tire rim. The spoke extensions 85 are integral with and project from the edge of the inner marginal flange 90 and are directed generally radially inwardly and axially outwardly and are appropriately angled in crossing relation to the spoke elements 84. At their inner end portions the spoke extensions 85 are engaged retainingly with the shoulder 86 which is provided with a series of appropriate apertures 91 into which terminal lugs 92 extend retainingly.

For retaining the cover 81 on the wheel, the outer cover member 83 carries therebehind a series of retaining spring finger clip members 93. Each of the clip members 93 has a base flange portion 94 which rests against the back of the cover member flange 89 and is secured thereto by means of a rivet 95. A spring loop 97 projects from the inner end portion of the base 94 in the space behind the cover flange 89 and has a retaining terminal leg 98 with radially outwardly angled stiff retaining terminal 99 which is adapted to retainingly engage in biting relation against the inner side of the intermediate flange 23 of the tire rim. In applying the cover to the wheel the cover is generally centered with respect to the wheel and pressed inwardly until the inner terminus of the flange 87 of the inner cover member abuts the nose bulge 21, and the retaining spring fingers 93 engage in retaining wedging engagement against the tire rim.

Removal of the cover is effected by applying a pry-off tool behind the reinforced edge 88 and forcing the outer cover member 83 outwardly. In order to facilitate the pry-off and avoid damage to the cover member 83, the base portion 94 of the retaining fingers is provided with a reinforcing and pry-off extension flange 100 which at its terminus abuts against the outer cover member 83 behind the return bent reinforcing flange 88 and has an intermediate generally axially inwardly facing shoulder 101 engageable by the tip of the pry-off tool for assisting in dislodging the cover from the wheel.

It will be appreciated that inasmuch as the rivets for the retaining spring fingers in each form of the cover are visible from the front of the cover through the spaces between the spokes, as is apparent from an inspection of Figure 1, removal of the cover is facilitated since a pry-off tool can be inserted behind the cover in the immediate vicinity of or directly in line with a selective spring finger. In the cover 10 of Figure 2, pry-off is effected by engagement of the underturned reinforcing flange 32 as a preliminary step and thereafter is engaged behind the shoulder 34 of the cover. Since the backing plate 44 substantially reinforces the outer cover member, damage to the same from pry-off tool force applied thereto will be avoided. In the covers 55 and 81, pry-off tool force is applied to the clip flange reinforcing and pry-off extensions and thereby pry-off tool damage is avoided. In each of the covers it will be observed that a pry-off shoulder is provided substantially spaced axially and radially inwardly from the outer extremity of the cover.

Reference is made to my copending application Serial No. 323,628, filed December 2, 1952, directed to the broader aspects of the retaining spring clips or fingers shown herein.

It will be understood that modifications and variations may be effected without departing from the scope of the novel concepts of the present invention.

I claim as my invention:

1. In a wheel structure including a tire rim and a wheel body, a cover for disposition at the outer side of the wheel including inner and outer members having respective series of spoke extensions, the spoke extensions of the inner cover member being connected at their end portions to the outer cover member and the spoke extensions of the outer cover member being connected at their end portions to the inner cover member, retaining spring members carried by one of said cover members for engagement with the wheel to retain the cover on the wheel, and means reinforcing the back of the outer cover member against pry-off tool damage.

2. In a wheel structure including a tire rim and a wheel body, a cover for disposition at the outer side of the wheel including inner and outer members having respective series of spoke extensions, the spoke extensions of the inner cover member being connected at their end portions to the outer cover member and the spoke extensions of the outer cover member being connected at their end portions to the inner cover member, retaining spring members carried by one of said cover members for engagement with the wheel to retain the cover on the wheel, and means reinforcing the back of the outer cover member against pry-off tool damage, said means comprising a separate plate attached to the back of the outer cover member.

3. In a wheel structure including a tire rim and a wheel body, a cover for disposition at the outer side of the wheel including inner and outer members having respective series of spoke extensions, the spoke extensions of the inner cover member being connected at their end portions to the outer cover member and the spoke extensions of the outer cover member being connected at their end portions to the inner cover member, retaining spring members carried by one of said cover members for engagement with the wheel to retain the cover on the wheel, and means reinforcing the back of the outer cover member against pry-off tool damage, said means comprising an extension on the retaining spring members at the back of the outer cover member.

4. In a cover for disposition at the outer side of a vehicle wheel, inner and outer cover members, said cover members being connected together by intermediate connecting means, one of said cover members having thereon retaining spring finger members, said retaining spring finger members comprising individual elongated strips of material harder than said one cover member and protectively underlying respective portions of the back of said one cover member, said finger members having angular pry-off shoulder means thereon spaced from the back of said one cover member.

5. In a cover for disposition at the outer side of a vehicle wheel, inner and outer cover members connected by spoke elements, elongated strip-like retaining spring finger members carried by the outer of said cover member, rivets securing said finger members intermediately to said outer cover member, said retaining spring fingers having cover engaging portions on one side of the rivets and reinforcing flanges on the other side of the rivets at the back of said outer cover member for pry-off tool leverage thereagain, said rivets providing visual indexing at the front of said outer cover member for placement of a pry-off tool.

6. In a cover for disposition at the outer side of a vehicle wheel, a cover member having a radially outer marginal portion for overlying a tire rim of a wheel, said portion having therebehind retaining spring finger members, said retaining spring finger members having reinforcing flanges engageable by the tip of a pry-off tool, said flanges having side flanges angled thereto to prevent side slippage of the pry-off tool.

7. In a wheel structure including a tire rim and a wheel body, a cover for the outer side of the wheel comprising a central cover portion and a radially outer cover portion connected together by spaced spoke elements, said spoke elements extending from a part of the central cover portion engageable adjacent the wheel body, and a member engageable between said cover part and the wheel body, said member comprising a plate extending behind said spoke elements.

8. In a wheel structure including a tire rim and a wheel body, a cover for the outer side of the wheel comprising a central cover portion and a radially outer cover portion connected together by spaced spoke elements, said spoke elements extending from a part of the central cover portion engageable adjacent the wheel body, and a member engageable between said cover part and the wheel body, said member comprising a resilient cushion.

9. In a wheel structure including a tire rim and a wheel body, a cover for the outer side of the wheel comprising a central cover portion and a radially outer cover portion connected together by spaced spoke elements, said spoke elements extending from a part of the central cover portion engageable adjacent the wheel body, and a member engageable between said cover part and the wheel body, said part of the central cover portion comprising an annular rib and said member interfitting with said rib.

10. For use in covering the outer side of a vehicle wheel of the disk spider type comprising a wheel body and a tire rim to afford the general illusion of the wheel being a wire spoke wheel, a cover including a pair of radially spaced sheet metal cover elements the inner of which is adapted to overlie the wheel body and the radially outer of which is adapted to overlie the tire rim, the radially inner cover element having formed integrally in one piece with its radially outer margin a series of generally radially outwardly extending spoke simulating extensions attached to said radially outer cover element, said radially outer cover element having a radially inner margin formed with spoke simulating generally radially inwardly directed extensions attached to said inner cover element, said spoke elements being related to afford substantial openings therethrough, and a plate carried in laminar reinforcing relation by the outer of said cover elements and extending across the back of the spoke extensions in generally closing relation to the openings therebetween whereby a contrasting background can be provided behind the spoke extensions.

11. In a wheel structure including a tire rim and a wheel body, a cover for the outer side of the wheel comprising a central cover portion providing a chamber over the central portion of the wheel body and a radially outer cover portion connected together by spaced spoke elements, said spoke elements extending from a part of the central cover portion which would normally be engageable with the wheel body, and a member carried by one of said cover portions engageable between said central cover portion and the wheel body and cooperating therewith to provide closure against foreign matter entering said chamber.

12. In a wheel structure including a tire rim having a side flange facing generally axially outwardly and an intermediate flange projecting generally axially and radially outwardly therefrom and facing radially inwardly, a cover for disposition at the outer side of the wheel including a portion to lie in concentric radially inwardly spaced relation from said intermediate flange and having thereon a series of circumferentially spaced resilient retaining fingers extending generally radially therefrom and having generally return bent generally axially outwardly extending retaining finger legs in assembly spaced radially outwardly from said cover portion and spaced radially inwardly from the intermediate flange and radially resiliently deflectable relative to both the cover and the intermediate flange, said legs having short and stiff radially and axially outwardly angled retaining terminals engageable at their tips in retaining gripping press-on, pry-off relation with said intermediate flange, the terminal tips normally lying to a greater diameter than the diameter of the engageable portion of the intermediate flange and thereby being radially inwardly deflected by the retaining engagement with the intermediate flange and thus placing said legs under resilient radially inwardly deflected tension, said cover portion and said retaining fingers being disposed in assembly in confronting relation to the side flange of the tire rim, said terminals being notched out to provide a plurality of corners at said tips to dig into the surface of the intermediate flange and retain the cover against turning on the wheel in service.

References Cited in the file of this patent

UNITED STATES PATENTS

| D. 168,977 | Ryerson | Mar. 3, 1953 |
| 2,069,952 | Hoffman | Feb. 9, 1937 |
| 2,368,228 | Lyon | Jan. 30, 1945 |
| 2,404,389 | Lyon | July 23, 1946 |
| 2,544,705 | Lyon | Mar. 13, 1951 |
| 2,676,850 | McLeod | Apr. 27, 1954 |

FOREIGN PATENTS

| 714,587 | France | Sept. 7, 1931 |